US010447075B2

(12) United States Patent
Totani et al.

(10) Patent No.: US 10,447,075 B2
(45) Date of Patent: Oct. 15, 2019

(54) ASTS-LESS BLOCK REDUNDANT ELECTRICAL TOPOLOGY WITH VARIABLE UPS WALK-INS

(71) Applicant: OATH INC., New York, NY (US)

(72) Inventors: Mozan Totani, Sunnyvale, CA (US); Jeff Davis, Lockport, NY (US)

(73) Assignee: OATH INC., New York, NY (US)

( * ) Notice: Subject to any disclaimer, the term of this patent is extended or adjusted under 35 U.S.C. 154(b) by 323 days.

(21) Appl. No.: 15/339,830

(22) Filed: Oct. 31, 2016

(65) Prior Publication Data
US 2018/0123387 A1    May 3, 2018

(51) Int. Cl.
*H02J 9/06* (2006.01)
*G06F 1/30* (2006.01)

(52) U.S. Cl.
CPC .............. *H02J 9/061* (2013.01); *G06F 1/30* (2013.01); *H02J 2009/068* (2013.01)

(58) Field of Classification Search
None
See application file for complete search history.

(56) References Cited

U.S. PATENT DOCUMENTS

| 2008/0034256 A1* | 2/2008 | Mosman | H02J 9/06 714/43 |
| 2016/0181861 A1* | 6/2016 | Familiant | H02J 9/06 307/66 |

* cited by examiner

*Primary Examiner* — Thienvu V Tran
*Assistant Examiner* — David M Stables
(74) *Attorney, Agent, or Firm* — James J. DeCarlo; Greenberg Traurig, LLP

(57) ABSTRACT

Systems and method for the distribution of data center power are disclosed. In one embodiment, the system includes a reserve power system comprising a switchboard, reserve UPS, and generator; and a primary power system, the primary power system comprising a primary UPS coupled to a primary power source via a primary input, a critical load via a primary output, and the reserve power system via an automatic bypass input. The primary power system may be configured to supply power from a utility to the critical load, detect an outage of the utility, supply power to the critical load using a stored energy device in response to detecting an outage of the utility, monitor the capacity of the stored energy device, transmit an on bypass request to the reserve power system transfer the critical load to the reserve power system upon determining that the capacity of the stored energy device has reached a pre-determined threshold, determine that the reserve power system is able to support the critical load and transfer the critical load to the reserve power system if the reserve system is able to support the critical load.

20 Claims, 6 Drawing Sheets

ASTS-LESS BLOCK REDUNDANT ELECTRICAL TOPOLOGY WITH VARIABLE UPS WALK-INS

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever

BACKGROUND

The present disclosure relates to power distribution networks, and more specifically to a system and method for providing block redundant backup power without utilizing an automatic static transfer switch.

As the size of data centers continues to increase exponentially, the number of devices required to support data center operations equally continues to increase. In order to support the growing number of devices (e.g., servers) required by data centers, operators are continually faced with managing the costs of efficiently powering these data centers. In context, power and cooling expenses can easily account for thirty percent or more of operating expenditures for most large data centers. Further, the capital expenditure by data center operators is equally increased due to the power and cooling hardware requirements for supporting additional data center devices such as servers.

A majority of data centers employ numerous pieces of hardware to implement power distribution networks. One of these pieces of hardware is an automatic static transfer switch (ASTS). An ASTS is designed to automatically switch between utility power and backup power (e.g., generator power) in the event of a power utility outage. ASTS devices are generally created by using power semiconductors (e.g., thyristors) to enable fast switching between power sources, generally requiring a quarter of a power cycle to switch between sources.

ASTS devices are generally used to switch the input of an uninterruptible power supply (UPS) between utility power and backup power (e.g., generator power). In current data center deployments, ASTS devices are necessary if the data center uses flywheel-based UPS devices. Flywheel-based UPS devices provide numerous benefits over battery-based UPS devices including reduced maintenance, lower costs, and lower environmental impact. However, these benefits come at the cost of reduced duration of power output from the flywheel(s). That is, flywheel-based UPS devices provide a significantly duration of stored power output. Thus, when using flywheel-based UPS devices, data centers commonly are required to use ASTS devices to provide rapid switching between power sources in order to compensate for the shorter duration of stored power output.

While ASTS devices allow for the continuous supply of power and enable rapid switching between power supplies, the advantages provided by ASTS devices suffer from numerous deficiencies and tradeoffs.

First, ASTS devices are highly complicated electrical devices and data centers must add additional cable terminations and breakers in order to support the ASTS devices. Second, the ASTS devices introduce additional points of failure in the overall electrical topology of a data center and are prone to malfunctions. Adding additional points of failure increases the chances of an outage due to faults in the ASTS devices and, correspondingly, increases the chances of major revenue losses for data center operators. Third, ASTS devices are expensive devices which directly increase the capital expenditures of data centers and additionally increase operating expenditure due to ongoing maintenance.

Thus, there exists a problem in the current state of the art: how to reduce the costs and risks associated with ASTS devices while maintaining continuous uptime of a power distribution networks.

BRIEF SUMMARY

To remedy these deficiencies, systems and methods are disclosed herein which allow data centers to reap the benefits of, for example, flywheel-based UPS devices while avoiding the costs and risks associated with ASTS devices that are currently required in data center power distribution networks. To eliminate the need for ASTS devices, the systems and methods utilize the automatic bypass input of UPS devices to quickly provide reserve power. By using an automatic bypass input of a UPS device, the systems and methods allow data center operators to remove complicated switching equipment, such as ASTS devices, and rely on the UPS itself to draw on power provided by a reserve power system. Additionally, the systems and method provide for management of the reserve power system, thus enabling the UPS devices to switch to reserve power quickly while ensuring that the reserve system is not overloaded.

In one embodiment, a system includes a reserve power system comprising a switchboard, reserve UPS, and generator; and a primary power system, the primary power system comprising a primary UPS coupled to a primary power source via a primary input, a critical load via a primary output, and the reserve power system via an automatic bypass input. The primary power system may be configured to supply power from a utility to the critical load, detect an outage of the utility, supply power to the critical load using a stored energy device in response to detecting an outage of the utility, monitor the capacity of the stored energy device, transmit an on bypass request to the reserve power system transfer the critical load to the reserve power system upon determining that the capacity of the stored energy device has reached a pre-determined threshold, determine that the reserve power system is able to support the critical load, and transfer the critical load to the reserve power system if the reserve system is able to support the critical load.

In another embodiment, a method comprises supplying power from a utility to a critical load via a primary power system comprising a primary UPS coupled to a primary power source via a primary input, a critical load via a primary output, and a reserve power system via an automatic bypass input; detecting an outage of the utility by monitoring the power received via a primary input of the primary UPS; supplying power to the critical load using a stored energy device in response to detecting an outage of the utility; monitoring the capacity of the stored energy device while supplying power to the critical load using a stored energy device; transmitting an on bypass request to the reserve power system upon determining that the capacity of the stored energy device has reached a pre-determined threshold, wherein the on bypass request is transmitted from the primary UPS to a switchboard of the reserve power system; determining that the reserve power system is able to support the critical load; and transferring the critical load to the reserve power system if the reserve system is able to support the critical load, wherein transferring the critical load to the reserve power system comprises coupling the critical load to the switchboard via an automatic bypass input of the primary UPS.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
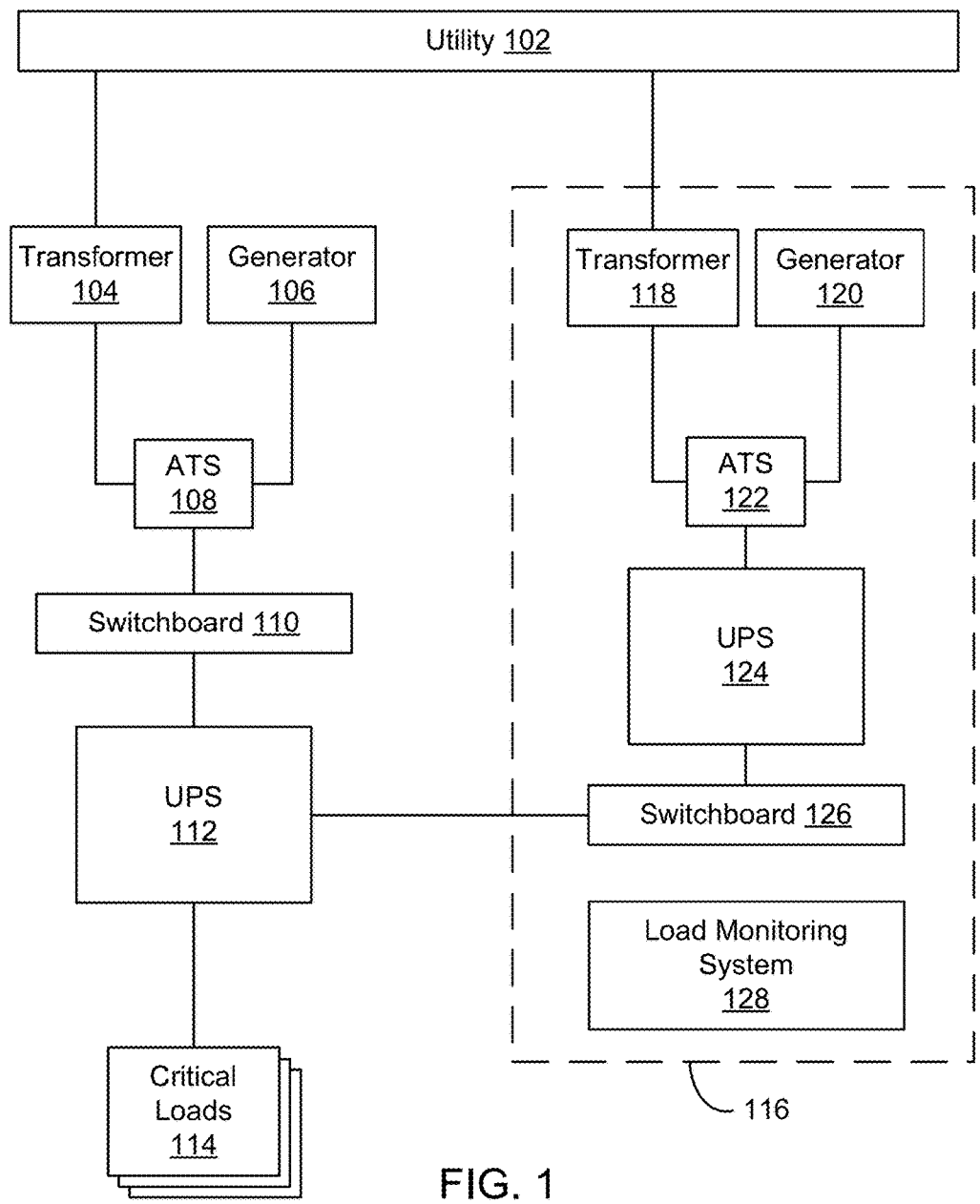
FIG. 1 is a block diagram of a power distribution system according to some embodiments of the disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

FIG. 1 is a block diagram of a power distribution system according to some embodiments of the invention.

As illustrated in FIG. 1, a utility 102 provides power to a critical loads 114 via a primary power system including transformer 104, generator 106, automatic transfer switch (ATS) 108, switchboard 110, and primary UPS 112. In one embodiment, utility 102 comprises a public utility, such as a power plant or other power generation source, which provides power via one more substations.

Critical loads 114 may include a variety of data center hardware such as servers or other data processing devices. For example, critical loads 114 may include one or more servers (e.g., an email server, a proxy server, a domain name system (DNS) server, a file server, an application server, a firewall, a virtual private network (VPN) gateway, an intrusion detection system), networking equipment (e.g., a router, a repeater, a switch, a hub), mainframe computer, and storage devices. A storage device includes a random access memory (RAM), a read-only memory (ROM), or a combination thereof. Examples of a storage device include a flash memory, a redundant array of independent disks, a hard disk, or a combination thereof In some embodiments, a critical load may include a plurality of servers arranged on one or more racks. Each server may be coupled to a unit distribution panel (UDP) which supplies power to the individual servers. In some embodiments, each critical load may include one or more UDP s. In one embodiment, a UDP may be coupled to primary UPS 112 and may distribute a single current from the primary UPS 112 to multiple devices included in the critical load.

In normal operation, utility 102 provides alternating current (AC) power to transformer 104. Transformer 104 may comprise a step down transformer utilized to step down input voltage from utility 102 to a pre-defined voltage level required by ATS 108. In some embodiments, transformer 104 may comprise multiple transformers.

ATS 108 receives stepped-down voltage from transformer 104 and, in normal operation, distributes power to switchboard 110.

In one embodiment, ATS 108 may comprise any suitable automatic transfer switch capable of switching between utility power and power received from a backup power source such as generator 106. In some embodiments, the ATS 108 may be configured to start generator 106. That is, in the event of a loss of power from utility 102, the ATS 108 may be configured to communicate with generator 106 in order to start the operation of generator 106. ATS 108 may issue a command to start a generator 106 by monitoring voltage levels received from transformer 104. Alternatively, ATS 108 may be configured to relay a command to start a generator 106 from another device, such as primary UPS 112 or an external network device.

Notably, ATS 108 may comprise any non-static transfer switch. In contrast to current power distribution networks employed by data centers, the system does not require the use of an ASTS in place of ATS 108 in order to quickly switch to backup power. Specifically, as discussed in more detail herein, the use of a lower cost and more reliable ATS 108 is enabled due to the coupling of UPS 112 and reserve power system 116 via an automatic bypass input. That is, the use of reserve power system 116 coupled to an automatic bypass input of UPS 112 enables reliable switching to backup power without the use of a highly complicated ASTS device used in place of ATS 108.

As illustrated in FIG. 1, ATS 108 provides power to switchboard 110. In the illustrated embodiment, switchboard 110 divides the current received from ATS 108 and distributes the current to one or more primary UPS devices. Although illustrated as a single device, the data center illustrated in FIG. 1 may house multiple primary UPS 112 devices. Reference is made in FIG. 1 to a single primary UPS 112 and the description thereof applies equally to additional primary UPS devices deployed within a data center.

Primary UPS 112 receives power from switchboard 110. In one embodiment, primary UPS 112 may include a plurality of electrical inputs including a primary input, automatic bypass input, and maintenance bypass input. Additionally, primary UPS 112 may include a plurality of electrical outputs including a primary output. In some embodiments, primary UPS 112 may be a line-interactive UPS. In this embodiment, the primary UPS 112 may be configured to control the frequency synchronization of the output with an automatic bypass input received from the reserve power system 116.

In normal operation, primary UPS 112 receives power from switchboard 110 via a primary electrical input present on the primary UPS 112. During an outage, primary UPS 112 may receive power from switchboard 126 via an automatic bypass input. In the illustrated embodiment, primary UPS 112 is configured to toggle between a primary input and an automatic bypass input upon the detection of a triggering condition. In one embodiment, primary UPS 112 may be configured to automatically "fail" to an automatic bypass input upon the detection of certain events such as power outages or device failures.

As discussed previously, by coupling primary UPS 112 to switchboard 126, the automatic triggering of ATS 108 may be prevented. Specifically, upon detecting an outage, in previous systems, a primary UPS would transmit a signal to an ASTS device causing a switch to backup power. In the illustrated system however, primary UPS 112 transmits an on bypass signal to switchboard 126 instead, thus obviating the need for an ASTS device in order to provide reserve power.

In one embodiment, primary UPS 112 may switch between a primary input and an automatic bypass input utilizing an electrically operated circuit breaker coupled to the primary input and automatic bypass input. In this embodiment, electrically operated circuit breakers may be controlled by a bypass controller present within the UPS 112.

In one embodiment, primary UPS 112 may be configured to monitor the input voltage level received from utility 102. Upon detecting an outage or fluctuation in the voltage or current level from utility 102, the primary UPS 112 may be configured to automatically switch to the automatic bypass input. In alternative embodiments, primary UPS 112 may be further configured to switch to the automatic bypass input if additional conditions have been met.

For example, primary UPS 112 may be configured to determine whether generator 106 has been fully started following the detection of a utility 102 outage. Commonly, generators may be slow to start following the detection of a power outage. In this scenario, primary UPS 112 may monitor generator 106 by monitoring the voltage or current output of generator 106.

Prior to switching to an automatic bypass, and immediately after detecting a utility 102 outage, primary UPS 112 may be configured to provide power via primary output using a stored energy device. In one embodiment, the stored energy device may comprise a battery-based stored energy device. In alternative embodiments, stored energy device may comprise a flywheel-based stored energy device.

Notably, however, primary UPS 112 may only be capable of providing power for a limited duration when using a stored energy device. For example, many flywheel-based UPS devices provide power output for only approximately ten seconds. Thus, primary UPS 112 may monitor the output of the stored power (e.g., flywheel output) in order to determine when the stored capacity nears a pre-determined cutoff threshold (e.g., 7% capacity remaining). Upon reaching this threshold, primary UPS 112 may again determine whether the output voltage of generator 106 has reached an acceptable level. If it is determined that generator 106 has not met the required output, primary UPS 112 may be configured to generate an "on bypass" signal. In the illustrated embodiment, primary UPS 112 may transmit the on bypass signal to switchboard 126 rather than switchboard 110. Thus, by preventing the transmission of the on bypass signal to switchboard 110, the system prevents the automatic starting of generator 106. That is, the primary UPS 112 may be configured to attempt to utilize reserve power system 116 rather than generator 106.

As discussed previously, primary UPS 112 may utilize an automatic bypass input source when determining that an outage is ongoing and that generator 106 has not yet reached a required power output level. As illustrated in FIG. 1, the automatic bypass input of primary UPS 112 may be connected to reserve power system 116.

Reserve power system 116 may include similar components as the primary power system discussed previously. Specifically, transformer 118, generator 120, and ATS 122 may be similarly constructed and provide similar functionality as transformer 104, generator 106, and ATS 108, respectively. Thus, the descriptions of transformer 104, generator 106, and ATS 108 are incorporated herein by reference with respect to transformer 118, generator 120, and ATS 122.

As illustrated in FIG. 1, reserve power system 116 includes a reserve UPS 124 that is connected to the output of ATS 122 and thus receives power from utility 102 (via transformer 118) or generator 120. Reserve UPS 124 provides power output to switchboard 126, which in turn divides the received current and distributes the current to the automatic bypass input of primary UPS 112. In the illustrated embodiment, a data center may include only a single reserve power system 116, while containing many primary UPS devices. Thus, the reserve power system 116 utilizes a switchboard to determine which primary UPS devices have requested power from the reserve power system 116 and which primary UPS devices are currently drawing power from reserve power system 116.

In alternative embodiments, reserve power system 116 may be connected to additional reserve power systems via reserve UPS 124. Specifically, reserve UPS 124 may also include an automatic bypass input similar to primary UPS 112. The automatic bypass input of reserve UPS 124 may then be connected to a second reserve power system containing the same components as reserve power system 116. In alternative embodiments, the system 100 may include numerous reserve power systems connected via bypass inputs of their respective UPS devices, thus forming a "daisy chained" reserve power system.

In the illustrated embodiment, the reserve power system 116 may further include a load monitoring system 128. In one embodiment, load monitoring system 128 may comprise hardware and/or software configured to monitor the various components (e.g., reserve UPS 124 and switchboard 126) of the reserve system 116. In one embodiment, load monitoring system 128 may comprise a device as illustrated in more detail with respect to FIG. 6. In one embodiment, load monitoring system 128 monitors the reserve power system 116 to determine the power drawn from reserve system 116. For example, load monitoring system 128 may monitor reserve UPS 124 to determine the percentage of the reserve UPS 124 energy capacity currently used by system. In one embodiment, the load monitoring system 128 may be further configured to prevent a primary UPS 112 from drawing power from reserve power system 116. For example, load monitoring system 128 may receive a request to transfer critical loads 114 to reserve power system 116. The load monitoring system 128 may then determine the usage of the reserve power system 116 upon receiving such a request. If load monitoring system 128 determines that the reserve power system 116 is currently operating under a pre-determined operating threshold, the load monitoring system 128 may allow primary UPS 112 to transfer to reserve power system 116. Alternatively, if load monitoring system 128 determines that reserve power system 116 is operating at or above the pre-determined operating threshold, load monitoring system 128 may prevent primary UPS 112 from transferring the critical loads 114 to the reserve power system 116. A method for inhibiting transfers of a primary UPS 112 is described more fully with respect to FIG. 5.

Figure 2:
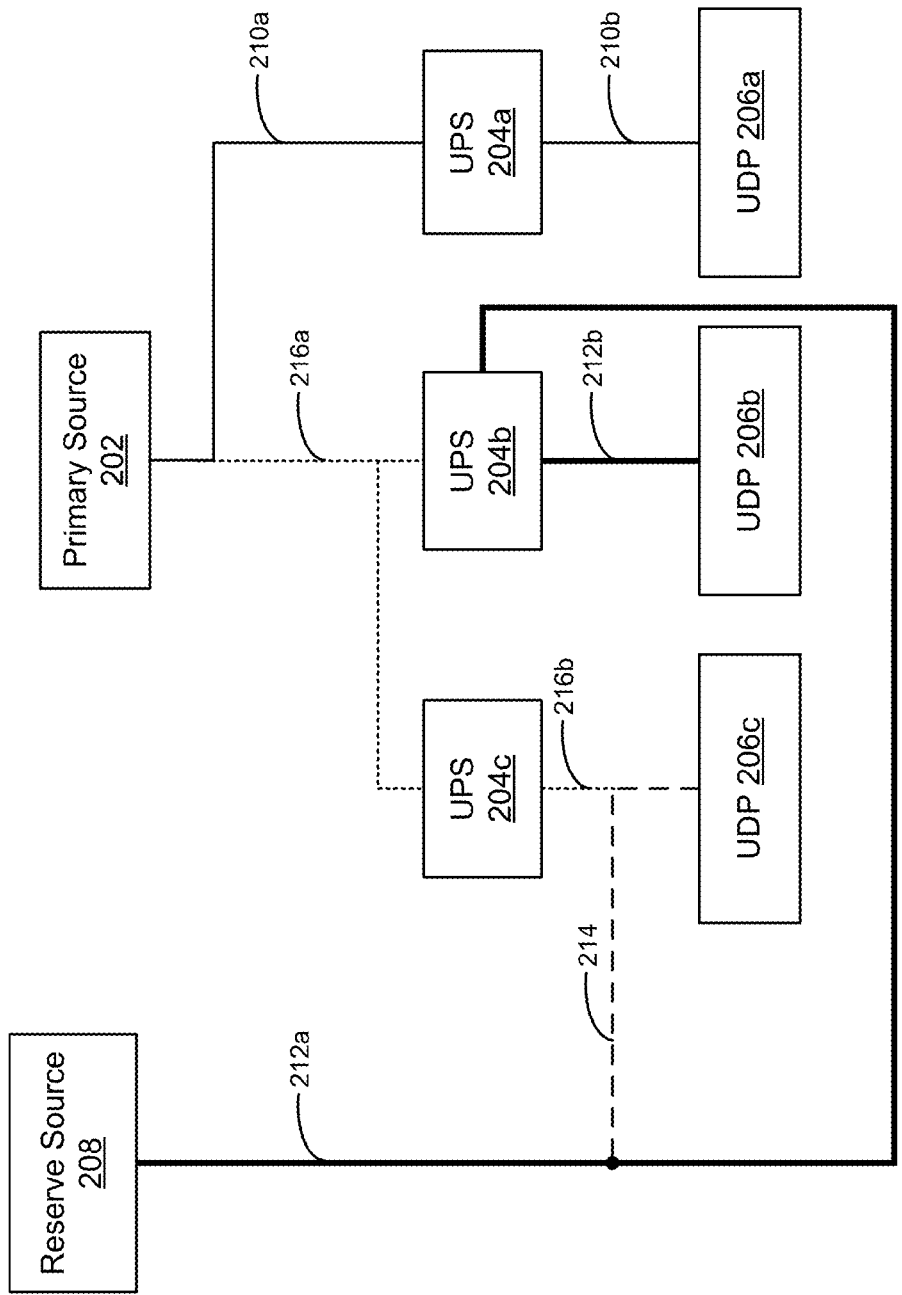
FIG. 2 is a block diagram of a power distribution system illustrating the flow of power according to some embodiments of the disclosure.

FIG. 2 is a block diagram of a power distribution system illustrating the flow of power according to some embodiments of the invention. FIG. 2 illustrates the flow of power in three scenarios: normal input (210), reserve input (212), and automatic bypass input (214)

As illustrated in FIG. 2, during a normal mode of operation, power is received from primary power source 202 and supplied via line 210a to UPS 204a at a primary input. As discussed previously, primary power source 202 may comprise a utility or backup power source (e.g., a diesel generator). In one embodiment, UPS 204a utilizes the received power to recharge any stored energy devices. UPS 204a subsequently provides output power to unit distribution panel (UDP) 206a via line 210b.

Additionally illustrated in FIG. 2 is the operation of a power distribution system during a "reserve" mode of operation. In this mode, UPS 204b does not receive power from primary power source 202 as indicated by "dead" line 216a. As discussed previously, UPS 204b may enter a monitoring stage upon detecting an outage of utility power. Additionally, UPS 204b may enter a "reserve" mode upon determining that generator power is not available and the power level of any stored energy reserves has reached a critical level. Upon entering a reserve mode, UPS 204b switches its input to an automatic bypass input and receives power from reserve source 208 via line 212a. In this mode of operation, UPS 204b may continue to operate as if receiving power from primary power source 202. That is, UPS 204b may continue to recharge any internal energy storage devices and may provide power to UDP 206b via line 212b.

As discussed previously, UPS 204b may operate in reserve mode until a primary power source 202 is available. For instance, UPS 204b may determine that a generator has reached the required voltage level and may re-enter a normal mode as discussed previously. Alternatively, UPS 204b may determine that a utility outage has ceased prior to a generator reaching the required voltage level and may thus return to a normal mode using utility power.

Additionally illustrated in FIG. 2 is the operation of a power distribution system during a "bypass" mode of operation. In a bypass mode of operation, UDP 206c does not receive power from the UPS 204c and instead receives power directly from reserve source 208 via line 214.

The system may enter a bypass mode in a variety of ways. In one embodiment, the system may enter a bypass mode upon detecting a fault in UPS 204c that prevents UPS 204c from supplying power to the UDP 206c, regardless of source. Alternatively, the system may enter a bypass mode when maintenance is being performed on UPS 204c. In this embodiment, a technician may manually place the system in bypass mode in order to perform maintenance or replace UPS 204c.

As can be seen in FIG. 2, the use of an automatic bypass input of UPS 204a-c allows a data center to avoid the use of additional external switching equipment such as an ASTS. Specifically, as illustrated in connection with UPS 204b, the system enables a UPS to automatically fail to a reserve power system using only the UPS device itself. Additionally, since the reserve source is coupled to, for example, UDP 206c, external switching equipment is not needed even if a given UPS, e.g., UPS 204c, fails completely.

Figure 3:
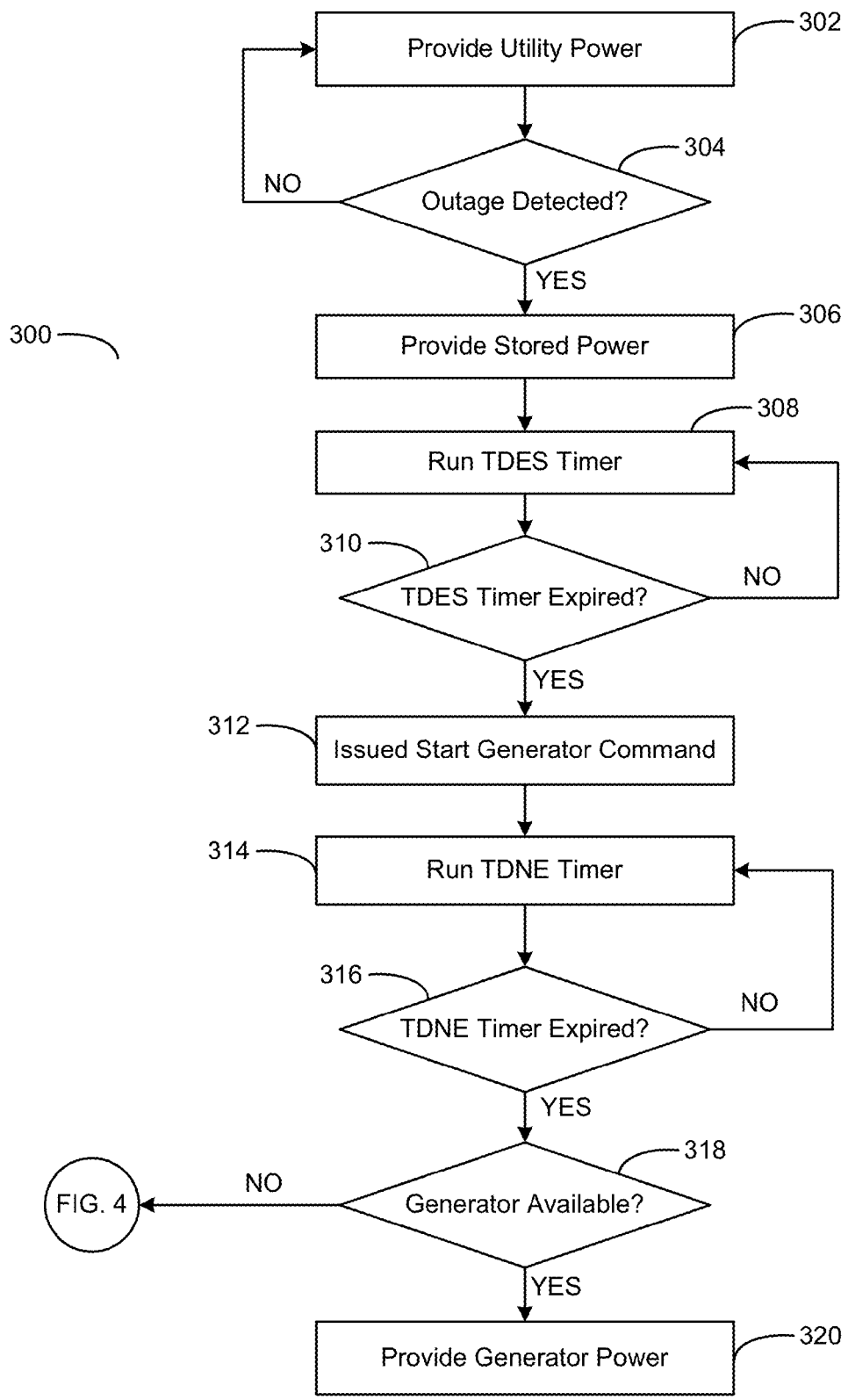
FIG. 3 is a flow diagram illustrating a method for providing generator power in a power distribution system according to some embodiments of the disclosure.

FIG. 3 is a flow diagram illustrating a method for providing generator power in a power distribution system according to some embodiments of the disclosure.

As illustrated in FIG. 3, the method 300 provides utility power, step 302. In one embodiment, utility power may comprise power received at a data center from a public utility via one more substations. In one embodiment, the method 300 may provide utility power to a plurality of critical loads via a primary UPS device and other electrical hardware as discussed more fully with respect to FIG. 1. That is, utility power may be received by the method 300 from a utility, stepped down using a transformer, and routed to a UPS device using an ATS. In alternative embodiments, step 302 may additionally include recharging a stored energy device present within the primary UPS. In alternative embodiments, the method 300 may monitor the power received from a utility in addition to monitoring power usage within the data center.

The method 300 continues providing utility power until an outage is detected, step 304. In one embodiment, detecting an outage may comprise monitoring the input voltage of a primary UPS device and determining that the source voltage level falls below a minimum threshold. Alternatively, or in conjunction with the foregoing, detecting an outage may comprise detecting an under or over voltage or an under or over frequency.

Upon detecting that an outage of a utility has occurred, the method 300 begins providing stored power, step 306. In one embodiment, providing stored power may comprise providing power from a primary UPS using stored energy devices present within the primary UPS. In one embodiment, the stored energy device may comprise one or more batteries connected to or contained within the primary UPS. In alternative embodiments, the stored energy device may comprise a flywheel connected to or contained within the primary UPS. In some embodiments, providing stored power may be performed automatically upon detecting a utility outage.

In the illustrated embodiment, supplying stored power enables the continuous operation of critical loads during utility outages or fluctuations while the primary UPS awaits a backup power source such as a diesel generator. However, proactively starting a backup generator for every potential outage may result in strain on the generator as well as unnecessary generator starts. Thus, in order to prevent unnecessary generator starts, the method 300 runs a time delay engine start timer (TDES), step 308. In some embodiments, a TDES timer may comprise a timer having a pre-configured duration that prevents the method 300 from attempting to issue a start generator command (step 312). For example, a time delay engine start may be set to one second. If so, the method 300 may delay starting a generator for a period of one second after determining that an outage has occurred. Upon the expiration of the time delay engine start timer, step 308, the method 300 may start the generator. However, if after one second, the method 300 determines that the utility has restored power, the method 300 may end and continue to utilize utility power as the input of a primary UPS. Notably, the use of a time delay engine start timer prevents unnecessary generator starts for utility outages of shorter durations.

In step 312, the method 300 issues a start generator command. In one embodiment, issuing a start generator command may comprise closing a start signal contact. In the illustrated embodiment, after issuing a start generator command, the method 300 may additionally run a time delay normal to emergency (TDNE) timer, step 314. In one embodiment, the TDNE timer may comprise a timer having a pre-configured delay period allowed after the generator has started and both the voltage and frequency from the generator are deemed acceptable to the monitoring relays. If the utility is restored or an external signal that caused the start of the generator is restored before this delay expires, no transfer may occur. Once this delay expires the transfer to generator may be committed.

The method 300 continues to check to determine if the TDNE timer has expired, step 316. After the expiration of the TDNE timer, the method 300 determines whether a backup generator is currently available, step 318. In one embodiment, determining whether a generator is available comprises determining whether the output voltage of an external generator meets a minimum required voltage level.

If the method 300 determines that a generator is available (e.g., the generator is outputting a voltage level above a required level), the method 300 may switch power sources to the generator and thus provide generator power to the critical loads, step 320. Alternatively, if the method 300 determines that a backup generator is not currently available, the method 300 may attempt to transfer the critical load to a backup power system as discussed more fully with respect to FIG. 4.

Figure 4:
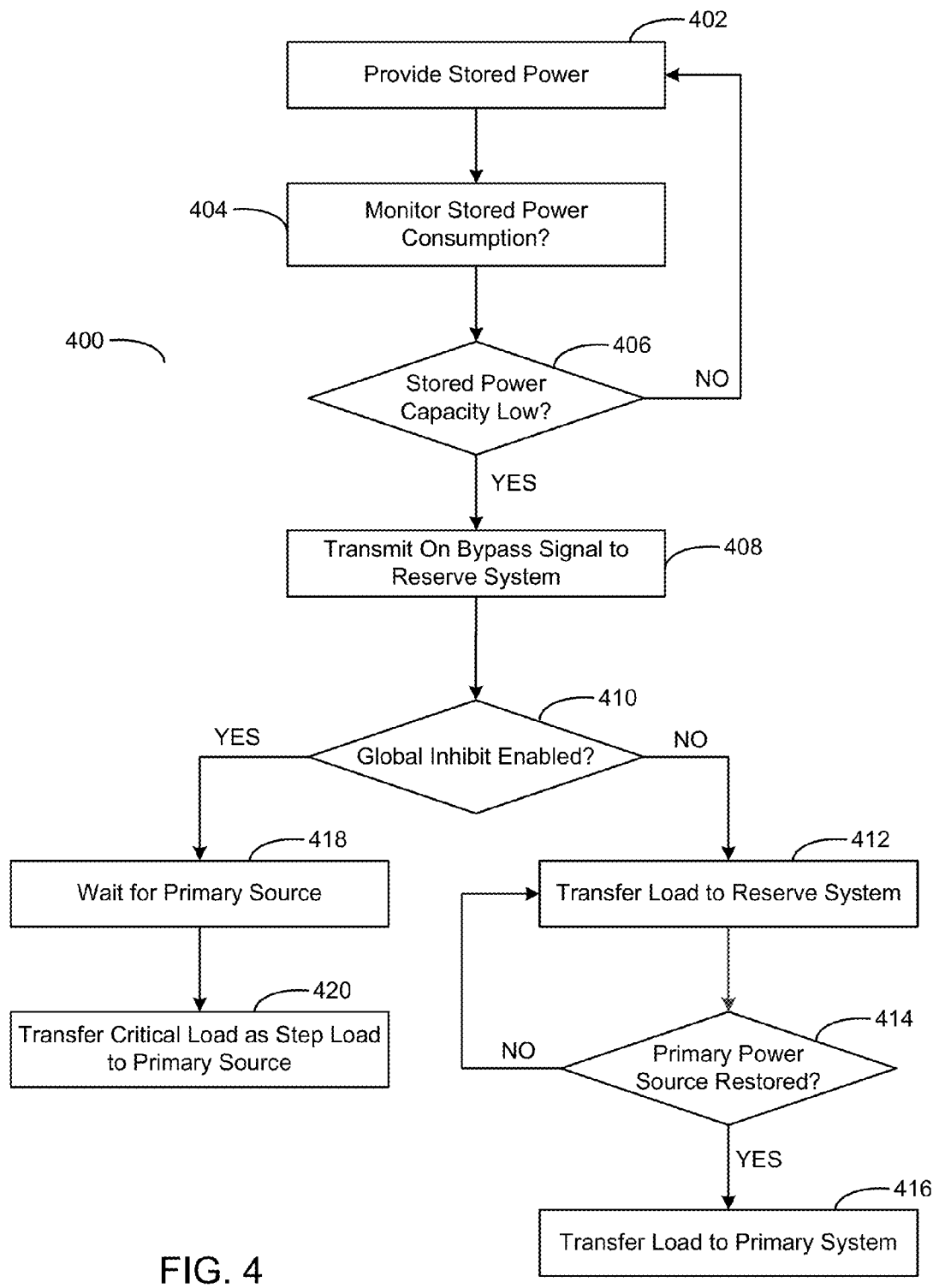
FIG. 4 is a flow diagram illustrating a method for providing reserve power in a power distribution system according to some embodiments of the disclosure.

FIG. 4 illustrates a method for providing reserve power in a power distribution system according to some embodiments of the disclosure.

As discussed previously, the method 400 illustrated in FIG. 4 may be performed if it is determined that an external generator is not available. In some embodiments, an external generator may take a significant amount of time to start and thus may not be available to provide sufficient power to ensure uninterrupted operation of a critical load. In some embodiments, a primary UPS utilizing a flywheel-based stored energy device may only supply a limited duration of internal power, a duration shorter than the time required to start a generator.

In step 402, the method 400 provides stored power from a stored energy device. In one embodiment, the stored energy device may comprise one or more batteries connected to or contained within the UPS. In alternative embodiments, the stored energy device may comprise one or more flywheels connected to or contained within the primary UPS.

In step 404, the method 400 monitors the stored power consumption of the stored energy device. In one embodiment, monitoring the stored power consumption may comprise monitoring the output voltage of the primary UPS device to determine if the stored power of the stored energy device is low. In one embodiment, monitoring a stored power device may comprise monitoring the capacity of the stored power device. In alternative embodiments, the method 400 may utilize a predetermined threshold for determining when the stored power device is low. For example, the method 400 may determine when the capacity of the stored power device is at seven percent. When the capacity of the stored power device approaches this limit, the method 400 may determine that the capacity of stored power device has reached the minimum acceptable limit, step 406. Until reaching that point, the method 400 may continue to supply power to a critical load in step 402.

Upon determining that the capacity of the stored power device has reached a predefined limit, the method 400 may transmit an "on bypass" signal or request to a reserve power system, step 408. The on bypass signal may be sent from a primary UPS to a reserve power system switchboard. In one embodiment, the on bypass signal alerts the reserve power system that the primary UPS is attempting to transfer its critical load to the reserve power system. As discussed previously, by utilizing an automatic bypass input of the UPS that is coupled to a reserve system switchboard, the method 400 avoids immediately transmitting an on bypass signal to a transfer switch, thus obviating the need for an ASTS device to provide backup power to UPS device. In one embodiment, the method 400 may be configured to automatically "fail" to an automatic bypass input upon the detection of certain events such as power outages or device failures.

After transmitting the on bypass request, the method 400 may determine if a global inhibit signal is enabled, step 410. In the illustrated embodiment, a global inhibit signal may be issued by a reserve power system and may prevent the primary UPS devices from transferring critical loads to the reserve power system when the reserve power system is unable to support additional critical loads. Issuance of a global inhibit signal is discussed more fully with respect to FIG. 5 and is incorporated herein by reference.

If the method 400 determines that a global inhibit signal has been enabled, the method 400 may wait for a primary power source to become available, step 418. In one embodiment, a primary power source may comprise a generator or utility power. Upon determining that a primary power source is available, the method 400 may then transfer a critical load to the primary power source as a step load, step 420.

Alternatively, if the method 400 determines that a global inhibit signal has not been enabled, the method 400 may transfer the critical load to the reserve power system, step 412. In one embodiment, transferring a critical load to a reserve power system may comprise switching the input line of a primary UPS device from utility power to the output of a reserve power system.

In some embodiments, the method 400 may continue to provide power to a critical load using reserve power system until utility power has been restored, step 414. Alternatively, the method 400 may continue may continue to provide power to a critical load using reserve power system until a generator has started. Alternatively, or in conjunction with the foregoing, the method 400 may additionally monitor the reserve power system to determine whether the reserve power system meets predetermined power threshold levels.

If the method 400 determines that a primary power source has been restored, step 414, the method 400 may transfer the critical load back to the primary system, step 416. In one embodiment, determining whether a primary power source has been restored may comprise monitoring the input voltage received from utility power. Alternatively, or in conjunction with the foregoing, determining whether a primary power source has been restored may comprise monitoring the input voltage received from an external generator.

Figure 5:
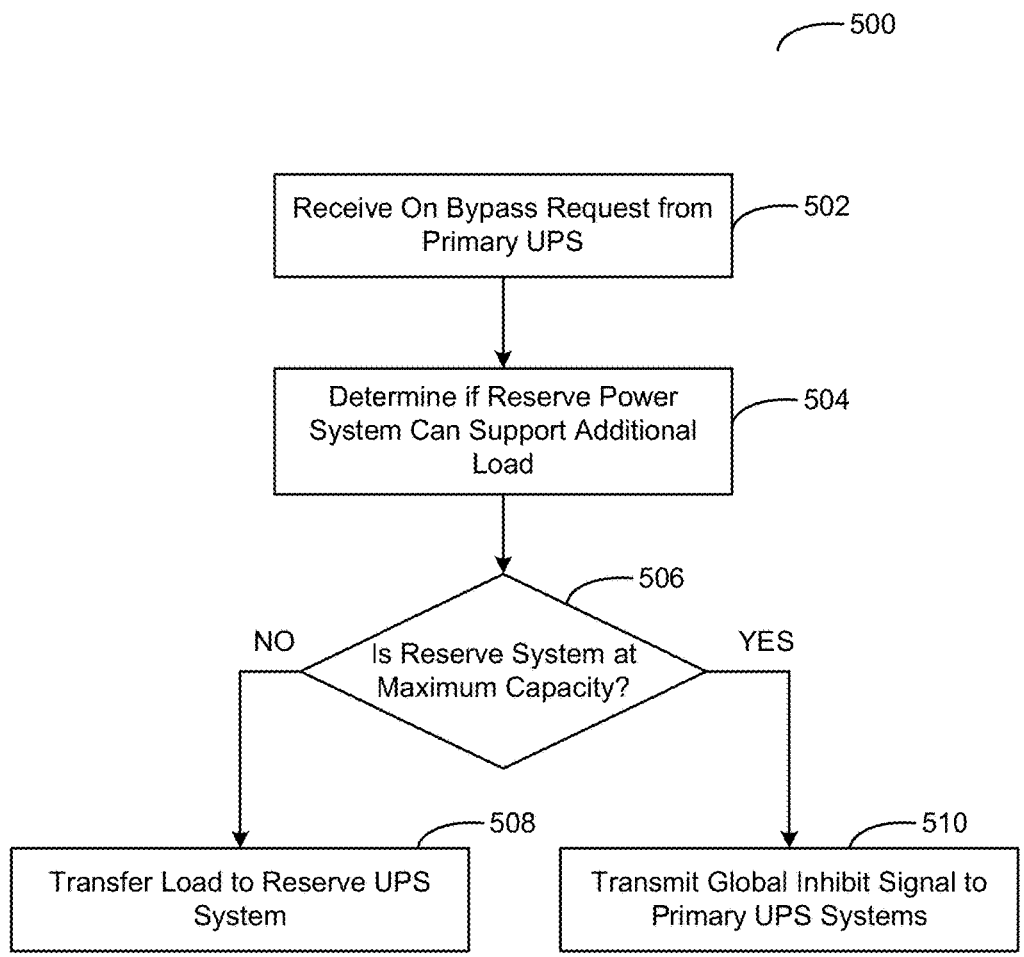
FIG. 5 is a flow diagram illustrating a method for prohibiting the transfer of a load to a reserve power system according to some embodiments of the disclosure.

FIG. 5 illustrates a method for prohibiting the transfer of a load to a reserve UPS system according to some embodiments of the invention.

As illustrated in FIG. 5, a method 500 may receive a bypass request from a primary UPS, step 502. In one embodiment, the primary UPS may comprise a primary UPS coupled to a critical load. For example, as illustrated in FIG. 1, a data center may include multiple critical loads, each critical load representing multiple computing devices (e.g., servers). For each critical load, a primary UPS may be placed between the utility power source and the critical load. The primary UPS monitors the input voltage received from the utility and is capable of transferring the critical load to backup or reserve power as described in connection with FIG. 3.

Upon detecting a loss of power received from a utility, the primary UPS may transmits an "on bypass" signal using one or more output ports of the primary UPS device. In one embodiment, an "on bypass" signal may indicate to upstream devices that the UPS is attempting to switch from utility power to an automatic bypass input line. In one embodiment, the method 500 may transmit an on bypass signal automatically upon the detection of a triggering event such as a power outage or device failure. In current systems, this signal is used to signal an ASTS device to switch to generator power. However, in the method 500, the on bypass signal is transmitted to a reserve power system due to the coupling of the primary UPS to the reserve system via an automatic bypass input.

In one embodiment, the primary UPS may transmit the on bypass request to a reserve power system. In one embodiment, the reserve power system may include a load monitoring system configured to receive the on bypass request and enable or disable the transfer of the primary UPS to the reserve power system. As discussed previously, in one embodiment, the reserve power system may include a switchboard configured to receive the on bypass request. The switchboard may be configured to forward the on bypass request to a load monitoring system which manages the number of loads connected to the reserve power system as discussed below.

In step 504, the method 500 determines if the reserve power system can support an additional critical load. In one embodiment, determining if the reserve power system can support an additional critical load comprises calculating the total load on the reserve UPS and the reserve switchboard. In one embodiment, upon receiving an on bypass request, the method 500 may transmit a request to the reserve UPS and reserve switchboard requesting usage details regarding the reserve UPS and reserve switchboard. In alternative embodiments, the method 500 may actively monitor current and/or output voltages of the reserve UPS and reserve switchboard in order to determine usage statistics. In one embodiment, the method 500 may monitor the reserve switchboard only upon failing to detect the reserve UPS. That is, the method 500 may primarily monitor the reserve UPS to determine usage of the reserve power system and may only monitor the switchboard upon failing to calculate the usage of the reserve power system based on the reserve UPS. In alternative embodiments, determining if the reserve power system can support an additional critical load comprises determining if the reserve power system is currently in a bypass mode.

In the illustrated embodiment, the method 500 may compare the returned or monitored usage statistics to a pre-determined reserve threshold to determine whether the reserve system is operating at maximum capacity, step 506.

For example, a data center may specify that a reserve power system can only operate at 90% of the maximum capacity of the reserve power system. In this example, the method 500 analyzes the usage statistics to determine if the reserve power system is at or near the maximum capacity. Alternatively, or in conjunction with the foregoing, the method 500 may additionally compute an expected usage based on the on bypass request. That is, the method 500 may forecast the percentage of usage if the on bypass request was granted.

If the method 500 determines that the reserve power system is not operating at or near maximum capacity, the method 500 allows the load powered by the primary power system to be transferred to the reserve power system, step 508. In one embodiment, transferring the load powered by the primary power system may be performed according to the method described in connection with FIG. 3 and is not repeated herein for the sake of clarity. As discussed previously, in some embodiments, the method 500 may only transfer the critical load to the reserve power system only upon determining that the reserve power system is capable of supporting the critical load without exceeding the maximum capacity of the reserve power system. In one embodiment, reserve power system, via a reserve switchboard, may transmit an indication to a primary power system that the reserve power system can support additional loads. In one embodiment, the indication may comprise the lack of a global inhibit signal.

Upon detecting that the reserve power system is operating (or will operate) at or above a pre-determined maximum capacity, the method 500 transmits a global inhibit signal to the primary UPS systems, step 510. In one embodiment, the method 500 may transmit the global inhibit signal to all primary UPS systems coupled to the reserve power system. In alternative embodiments, the method 500 may only transmit the global inhibit signal to those primary UPS systems that are not actively drawing power from the reserve power system. In alternative embodiments, the method 500 may only transmit the global inhibit signal to the primary UPS that issued the on bypass request.

The global inhibit signal prevents the primary UPS systems that receive the signal from transferring their critical loads to the reserve power system that issued the global inhibit signal. In one embodiment, in response to receiving a global inhibit signal, the primary UPS may transfer its load to an alternative power source. For example, the primary UPS may transfer its load to an external generator (e.g., a diesel generator). Specifically, upon receiving a global inhibit signal, the primary UPS may wait until a primary power source becomes available and may transfer the critical load the primary power source as a step load once the primary power source is available.

Figure 6:
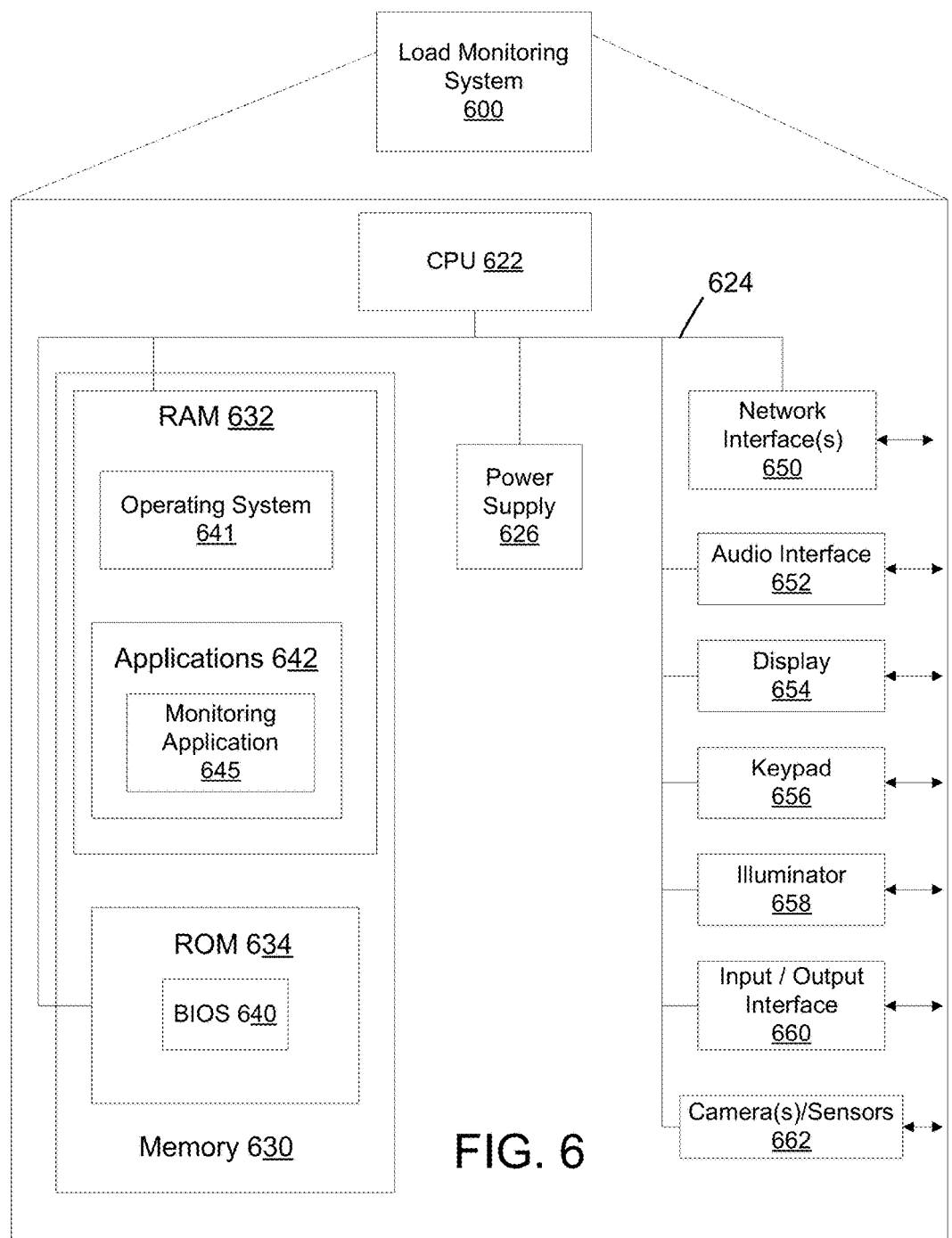
FIG. 6 is a block diagram of a load monitoring system according to some embodiments of the disclosure.

FIG. 6 is a block diagram of a load monitoring system according to some embodiments of the disclosure.

Load monitoring system 600 may include many more or less components than those shown in FIG. 6. However, the components shown are sufficient to disclose an illustrative embodiment for implementing the present disclosure. Load monitoring system 600 may represent, for example, load monitoring systems discussed above in relation to FIG. 1.

As shown in FIG. 6, load monitoring system 600 includes a processing unit (CPU) 622 in communication with a mass memory 630 via a bus 624. Load monitoring system 600 also includes a power supply 626, one or more network interfaces 650, an audio interface 652, a display 654, a keypad 656, an illuminator 658, an input/output interface 660, and a camera(s) or other optical, thermal or electromagnetic sensors 662. Load monitoring system 600 can include one camera/sensor 662, or a plurality of cameras/sensors 662, as understood by those of skill in the art.

Power supply 626 provides power to load monitoring system 600. A rechargeable or non-rechargeable battery may be used to provide power. The power may also be provided by an external power source, such as an AC adapter or a powered docking cradle that supplements and/or recharges a battery.

Load monitoring system 600 may optionally communicate with a base station (not shown), or directly with another computing device. Network interface 650 includes circuitry for coupling load monitoring system 600 to one or more networks, and is constructed for use with one or more communication protocols and technologies. Network interface 650 is sometimes known as a transceiver, transceiving device, or network interface card (NIC).

Audio interface 652 is arranged to produce and receive audio signals such as the sound of a human voice. For example, audio interface 652 may be coupled to a speaker and microphone (not shown) to enable telecommunication with others and/or generate an audio acknowledgement for some action. Display 654 may be a liquid crystal display (LCD), gas plasma, light emitting diode (LED), or any other type of display used with a computing device. Display 654 may also include a touch sensitive screen arranged to receive input from an object such as a stylus or a digit from a human hand.

Keypad 656 may comprise any input device arranged to receive input from a user. For example, keypad 656 may include a push button numeric dial, or a keyboard. Keypad 656 may also include command buttons that are associated with selecting and sending images. Illuminator 658 may provide a status indication and/or provide light. Illuminator 658 may remain active for specific periods of time or in response to events. For example, when illuminator 658 is active, it may backlight the buttons on keypad 656 and stay on while the load monitoring system is powered. Also, illuminator 658 may backlight these buttons in various patterns when particular actions are performed, such as dialing another client device. Illuminator 658 may also cause light sources positioned within a transparent or translucent case of the client device to illuminate in response to actions.

Load monitoring system 600 also comprises input/output interface 660 for communicating with external devices, such as UPS or switchboard devices, or other input or devices not shown in FIG. 6. Input/output interface 660 can utilize one or more communication technologies, such as USB, infrared, Bluetooth™, or the like.

Mass memory 630 includes a RAM 632, a ROM 634, and other storage means. Mass memory 630 illustrates another example of computer storage media for storage of information such as computer readable instructions, data structures, program modules or other data. Mass memory 630 stores a basic input/output system ("BIOS") 640 for controlling low-level operation of load monitoring system 600. The mass memory also stores an operating system 641 for controlling the operation of load monitoring system 600. It will be appreciated that this component may include a general purpose operating system such as a version of UNIX, or LINUX™, or a specialized client communication operating system such as Windows Client™ or the Symbian® operating system. The operating system may include, or interface with a Java virtual machine module that enables control of hardware components and/or operating system operations via Java application programs.

Memory 630 further includes one or more data stores, which can be utilized by load monitoring system 600 to store, among other things, applications 642 and/or other data. For example, data stores may be employed to store information that describes various capabilities of load monitoring system 600. The information may then be provided to another device based on any of a variety of events, including being sent as part of a header during a communication, sent upon request, or the like. At least a portion of the capability information may also be stored on a disk drive or other storage medium (not shown) within load monitoring system 600.

Application 642 may include computer executable instructions which, when executed by load monitoring system 600, enable the transfer of data between load monitoring system 600 and other devices within a data center. For example, monitoring application 645 may enable the control and operation of a UPS or switchboard device. Alternatively, or in conjunction with the foregoing, monitoring application 645 may enable the transmission or reception of various signals between data center hardware. In one embodiment, monitoring application 645 may perform steps of the methods illustrated in connection with FIGS. 4 and 5. Specifically, monitoring application 645 may be configured to receive an on bypass request from a UPS device and determine whether a load should be supported by a reserve power system, or whether a global inhibit signal should be transmitted to a primary power system.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A system for power distribution comprising:
a reserve power system comprising a switchboard, reserve UPS, and generator; and
a primary power system, the primary power system comprising a primary UPS coupled to a primary power source via a primary input, a critical load via a primary output, and the reserve power system via an automatic bypass input, wherein the primary power system is configured to:
supply power from a utility to the critical load via the primary output;
detect an outage of the utility by monitoring the power received via the primary input;
supply power to the critical load using a stored energy device in response to detecting an outage of the utility;
monitor the capacity of the stored energy device while supplying power to the critical load using a stored energy device;
transmit an on bypass request to the reserve power system upon determining that the capacity of the stored energy device has reached a pre-determined threshold, wherein the on bypass request is transmitted from the primary UPS to the switchboard;
determine that the reserve power system is able to support the critical load; and
transfer the critical load to the reserve power system if the reserve system is able to support the critical load.

2. The system of claim 1 wherein determining that the reserve power system is able to support the critical load comprises determining whether the reserve power system has transmitted a global inhibit signal.

3. The system of claim 2 wherein the reserve power system further includes a load monitoring system configured to:
receive the on bypass signal from the primary power system;
determine if the reserve power system can support the critical load;
enable the transfer of the critical load to the reserve power system upon determining that the reserve power system can support the critical load; and
transmit the global inhibit signal to the primary power system upon determining that the reserve power system cannot support the critical load, wherein the global inhibit signal prevents the primary power system from transferring the critical load to the reserve power system.

4. The system of claim 3 wherein determining if the reserve power system can support the critical load comprises:
    calculating the total load of the reserve power system;
    determining that the reserve power system can support the critical load if the total load is below a pre-determined reserve threshold; and
    determining that the reserve power system cannot support the critical load if the total load is equal to or above a pre-determined reserve threshold.

5. The system of claim 4 wherein calculating the total load of the reserve power system comprises calculating the load of the reserve UPS.

6. The system of claim 3 wherein determining if the reserve power system can support the critical load comprises determining whether the reserve power system is in a bypass mode.

7. The system of claim 3 wherein the primary power system is further configured to:
    receive a global inhibit signal from the reserve power system;
    monitor the availability of the primary power source; and
    transfer the critical load to the primary power source as a step load upon determining that primary power source is available.

8. The system of claim 1 wherein the primary power system is further configured to:
    monitor a primary power source after transferring the critical load to the reserve power system; and
    transfer the critical load to the primary power source upon determining that primary power source is available.

9. The system of claim 1 wherein the reserve UPS includes an automatic bypass input and wherein the reserve power system is coupled to an output of a secondary reserve power system via the automatic bypass input of the reserve UPS.

10. The system of claim 1 wherein the primary power system is further configured to:
    initiate a time delay engine start timer in response to detecting an outage of the utility; and
    issue a start generator command in response to determining that the time delay engine start timer has expired.

11. A method for power distribution, the method comprising:
    supplying power from a utility to a critical load via a primary power system comprising a primary UPS coupled to a primary power source via a primary input, a critical load via a primary output, and a reserve power system via an automatic bypass input;
    detecting an outage of the utility by monitoring the power received via the primary input of the primary UPS;
    supplying power to the critical load using a stored energy device in response to detecting an outage of the utility;
    monitoring the capacity of the stored energy device while supplying power to the critical load using a stored energy device;
    transmitting an on bypass request to the reserve power system upon determining that the capacity of the stored energy device has reached a pre-determined threshold, wherein the on bypass request is transmitted from the primary UPS to a switchboard of the reserve power system;
    determining that the reserve power system is able to support the critical load; and
    transferring the critical load to the reserve power system if the reserve system is able to support the critical load, wherein transferring the critical load to the reserve power system comprises coupling the critical load to the switchboard via an automatic bypass input of the primary UPS.

12. The method of claim 11 determining that the reserve power system is able to support the critical load comprises determining whether the reserve power system has transmitted a global inhibit signal to the primary power system.

13. The method of claim 12 further comprising:
    receiving the on bypass signal from the primary power system;
    determining if the reserve power system can support the critical load;
    enabling the transfer of the critical load to the reserve power system upon determining that the reserve power system can support the critical load; and
    transmitting the global inhibit signal to the primary power system upon determining that the reserve power system cannot support the critical load, wherein the global inhibit signal prevents the primary power system from transferring the critical load to the reserve power system.

14. The method of claim 13 wherein determining if the reserve power system can support the critical load comprises:
    calculating the total load of the reserve power system;
    determining that the reserve power system can support the critical load if the total load is below a pre-determined reserve threshold; and
    determining that the reserve power system cannot support the critical load if the total load is equal to or above a pre-determined reserve threshold.

15. The method of claim 14 wherein calculating the total load of the reserve power system comprises calculating the load of a reserve UPS.

16. The method of claim 13 wherein determining if the reserve power system can support the critical load comprises determining whether the reserve power system is in a bypass mode.

17. The method of claim 13 further comprising:
    receiving a global inhibit signal from the reserve power system;
    monitoring the availability of the primary power source; and
    transferring the critical load to the primary power source as a step load upon determining that primary power source is available.

18. The method of claim 11 further comprising:
    monitoring a primary power source after transferring the critical load to the reserve power system; and
    transferring the critical load to the primary power source upon determining that primary power source is available.

19. The method of claim 11 further comprising transferring the load of the reserve power system to a secondary reserve power system via an automatic bypass input of a reserve UPS within the reserve power system.

20. The method of claim 11 further comprising:
    initiating a time delay engine start timer in response to detecting an outage of the utility; and
    issuing a start generator command in response to determining that the time delay engine start timer has expired.

* * * * *